UNITED STATES PATENT OFFICE.

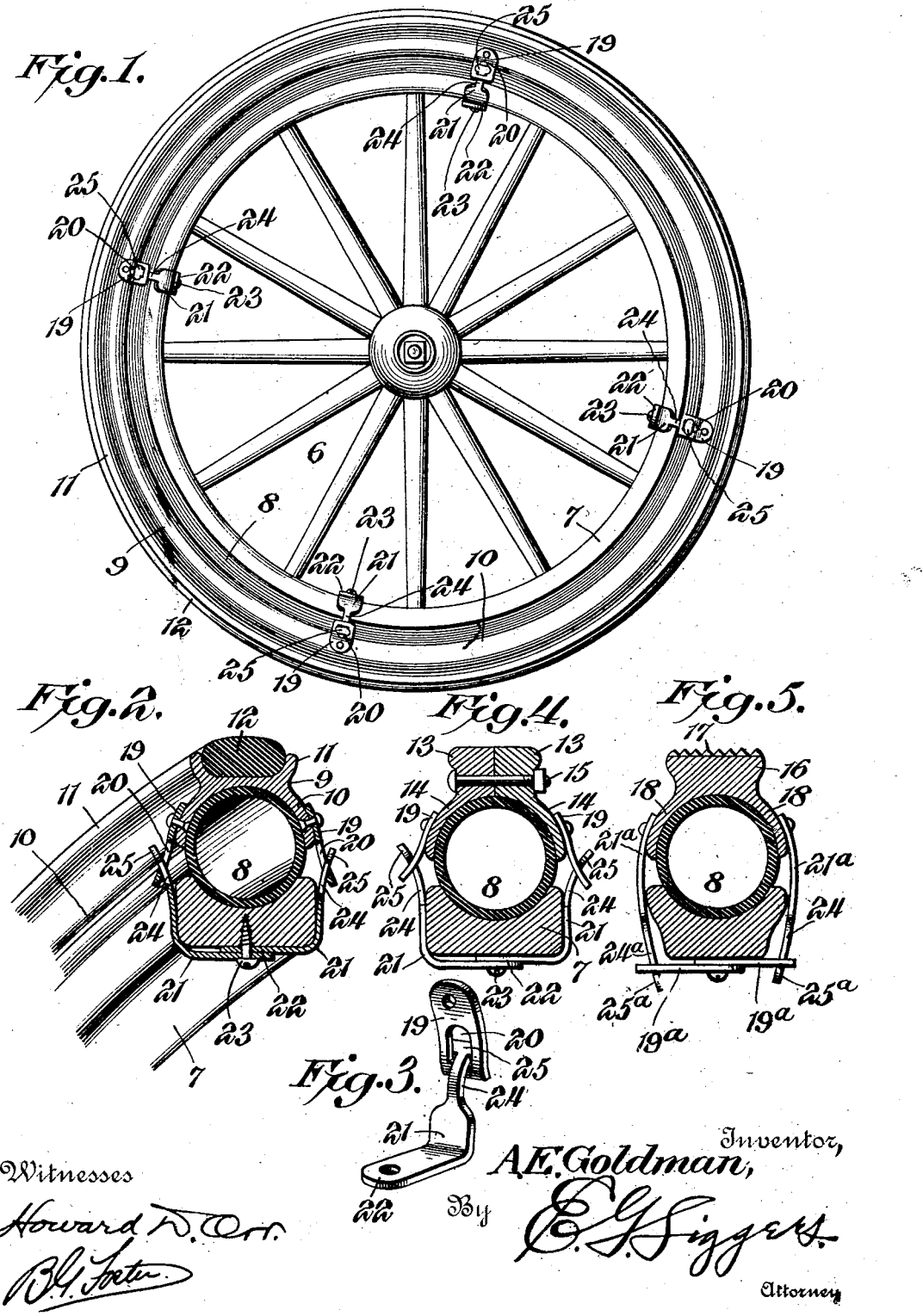

ALLIE ELIAS GOLDMAN, OF GALENA, KANSAS.

TIRE-PROTECTOR.

954,730.  Specification of Letters Patent.  Patented Apr. 12, 1910.

Application filed August 4, 1908. Serial No. 446,927.

*To all whom it may concern:*

Be it known that I, ALLIE E. GOLDMAN, a citizen of the United States, residing at Galena, in the county of Cherokee and State of Kansas, have invented a new and useful Tire-Protector, of which the following is a specification.

The present invention relates to means for protecting pneumatic or other tires from puncture and wear.

The object is to provide a very simple shoe that can be easily applied to any well known form of tire, and has means for fastening the same to the wheel, said means permitting the resilient action of the tire.

In the accompanying drawings:—Figure 1 is a side elevation of a wheel equipped with the novel protector. Fig. 2 is a sectional perspective view of a portion of the same. Fig. 3 is a detail perspective view of one of the fastening devices. Figs. 4 and 5 are cross sectional views of slightly modified forms of construction.

Similar reference numerals designate corresponding parts in all the figures of the drawings.

In the embodiment illustrated in Figs. 1, 2 and 3, the wheel, which is designated 6, is provided with the usual rim or felly 7 on which is placed a tire 8 that may be of any suitable construction. Arranged over the tire 8 is a protector shoe 9, which in the embodiment disclosed in Figs. 1 and 2, is formed of a single piece of metal having inwardly extending flanges 10 forming a seat for the outer portion of the tire and upwardly extending flanges 11 forming a seat for a tread 12 of solid rubber or other suitable material. The particular construction of the shoe may, however, be modified. Thus in Fig. 4, said shoe consists of sections 13 having inwardly extending flanges 14, the outer portion, however, being of metal. The sections are fastened together at suitable intervals by bolts 15. In this form of construction, it will be noted that the yielding tread is eliminated.

In Fig. 5, the shoe, which is designated by the reference numeral 16, is a single piece of metal having its outer face roughened, as shown at 17, the inner portion having inwardly extending flanges 18 forming a seat for the tire. The rubber or yielding tread 12 is, however, ordinarily preferred, as it avoids slipping and is practically noiseless in operation.

For the purpose of securing the shoe in place, ears 19 are secured to opposite sides of said shoe and extend inwardly alongside the exposed portion of the tire. These ears are provided with elongated slots 20. Other sets of ears 21 are carried by the felly, the ears of each set having their inner terminals overlapped, as shown at 22 and fastened in place by a screw 23 or other suitable device. The outer portions of the ears 21 extend beyond the ends of the ears 19 and have elongated necks 24 that pass through the slots 20. Said necks 24 carry at their ends heads 25 arranged transversely of and considerably wider than the slots. Thus it will be evident that said ears connect the felly and protector, and at the same time, permit the shoe and tire to have the necessary resilient action, without danger of separating the ears from each other. The parts can be readily assembled by turning the ears 21 so that the heads 25 can be passed through the slots 20 when said ears 21 are unfastened. It will be evident that a protector of the type described can be readily applied to any well known type of wheel and removed therefrom. It is particularly advantageous for automobiles and other heavy self-propelled vehicles, but it is not necessarily limited to this use.

From the foregoing, it is thought that the construction, operation and many advantages of the herein described invention will be apparent to those skilled in the art without further description; and it will be understood that various changes in the size, shape, proportion, and minor details of construction may be resorted to without departing from the spirit or sacrificing any of the advantages of the invention. For instance, the ears may be reversed, as shown in Fig. 5, in which case, the ears 19[a] are secured to the felly and have the elongated slots. The other ears 21[a] are carried by the shoe, and have elongated necks 24[a] carrying at their ends heads 25[a], the necks passing through the slots and the heads being located below the ears 19[a]. In this form of construction, said ears 19[a] are preferably of spring steel, so as to permit them to yield somewhat when there is outward movement on the part of the ears 21[a].

Having thus fully described my invention, what I claim as new, and desire to secure by Letters Patent, is:—

1. A wheel felly, a tire thereon, and a protector shoe extending around the tire, in combination with a device for fastening the shoe in place, said device consisting of a pair of metal members extending transversely to the felly with apertured overlapping inner ends, a fastening passing through the apertures and entering the felly for securing the members in place, the outer ends of the members projecting from opposite sides of the felly, and a second pair of members fastened to the shoe at opposite sides thereof, one pair of members having slots at their outer ends, and the other pair of members having longitudinally-extending necks arranged to loosely engage in the said slots and transversely extending heads on the outer extremities of the necks for retaining the latter in the said slots.

2. A wheel felly, a tire thereon, a protector shoe consisting of an annular semitubular structure composed of two parts, and fastenings extending through the said parts for detachably connecting the same, in combination with a device for fastening the shoe in place, said device consisting of a pair of metal oppositely-disposed members of approximately L-shaped form having portions extending transversely to the felly with apertured overlapping inner ends, a fastening passing through the apertures and entering the felly for securing the members in place, the outer ends of the members projecting from opposite sides of the felly, and a second pair of members fastened to the shoe at opposite sides thereof, one pair of members having slots at their outer ends and elongated longitudinally of the members, and the other pair of members having longitudinally-extending necks arranged to loosely engage in the said slots and transversely extending heads on the outer extremities of the necks of greater length than the width of the slots for retaining the heads in the said slots.

3. A wheel felly, a tire thereon, a protector shoe consisting of an annular semitubular structure composed of two symmetrical parts surrounding the tire and spaced from the felly, and fastenings extending through the said parts of the shoe for securing them together, in combination with a plurality of fastening devices each composed of members fastened to the felly and extending radially across the side faces thereof and terminating in outwardly-bent longitudinally-extending necks formed with transverse elongated heads projecting from both sides of the neck, and inflexible members fastened to the parts of the shoe and having longitudinally-extending slots of greater length and less width than the length of the heads to connect the felly and shoe members by inserting the heads through the slots when disposed longitudinally of the latter and to be locked by turning the heads transverse to the slots, said necks being movable back and forth in the slots as the tire is compressed and expanded.

In testimony that I claim the foregoing as my own, I have hereto affixed my signature in the presence of two witnesses.

ALLIE ELIAS GOLDMAN.

Witnesses:
H. E. PETTIGREW,
M. A. ROMSTEDT.